United States Patent [19]

Behr

[11] 4,096,993
[45] Jun. 27, 1978

[54] COMPENSATED CONTROL VALVE

[75] Inventor: Joseph L. Behr, Des Peres, Mo.

[73] Assignee: Emerson Electric Co., St. Louis, Mo.

[21] Appl. No.: 761,291

[22] Filed: Jan. 21, 1977

[51] Int. Cl.² .................... F16K 31/18; G05D 23/20
[52] U.S. Cl. .................................. 236/68 B; 251/11
[58] Field of Search ................. 251/11; 236/68 B; 60/529

[56] References Cited

U.S. PATENT DOCUMENTS

| 3,424,377 | 1/1969 | Steghart et al. ............... 236/68 R |
| 3,967,781 | 7/1976 | Kunz ............................. 60/529 |

*Primary Examiner*—William E. Wayner
*Attorney, Agent, or Firm*—Polster, Polster and Lucchesi

[57] ABSTRACT

A control valve is provided with environmental temperature compensation. Preferably, the valve is an electrically operated device having a valve member mounted for movement between at least first position and a second position. Means for electrically operating the device includes heater means interleafed with bi-metallic discs so that electrical energy input to the heater means controls disc expansion and contraction, thereby controlling physical position of the valve member. In a stand alone version of the control valve, a sensor is operatively connected between the bi-metallic discs and an electrical control means. The electrical control means is adapted to compare the signal generated by the sensor with a predetermined set point for controlling electrical energy input to the heater means. The control means regulates that electrical input until equality of comparison is attained. In system applications, the set point may be dependent upon any preselected variable, the control means in this last instance acting to regulate power input to the heater means to control valve operation in accordance with the condition of the variable selected.

4 Claims, 6 Drawing Figures $T_B = T_H + T_F + T_A$ $T_B = -e K_H + T_F + T_A$ $e = -T_B K_S + V_S$ $T_B = K_H V_S - T_B K_S K_H + T_F + T_A$ $T_B (1 + K_S K_H) = K_H V_S + T_F + T_A$ $T_B = \dfrac{K_H V_S}{(1 + K_S K_H)} + \dfrac{T_F}{(1 + K_S K_H)} + \dfrac{T_A}{(1 + K_S K_H)} =$ $= \dfrac{V_S K_H}{1 + K_S K_H} + \dfrac{T_F + T_A}{1 + K_S K}$ IF $K_H \gg$ AND $K_S K_H \gg T_F$ OR $T_A$ $\dfrac{T_F + T_A}{1 + K_S K_H} \Rightarrow 0 ; \qquad \dfrac{K_H}{1 + K_S K_H} \Rightarrow 1$ $T_B \cong V_S$

COMPENSATED CONTROL VALVE

BACKGROUND OF THE INVENTION

This invention relates to electrically operated modulating valves finding application in refrigeration or air conditioning systems. While the invention is described in detail with respect to such systems, those skilled in the art will recognize the wider applicability of the inventive principles disclosed hereinafter.

Electrically operable control valves are known in the art. For example, one particular valve with which the invention disclosed hereinafter finds application is disclosed in the U.S. Pat. to Kunz, No. 3,967,781. In Kunz, an electrically operated expansion valve is provided including a shell defining a chamber. A valve body is mounted in the chamber. The valve body has an opening in it, and a valve pin is movably mounted between a first position closing the opening, and at least one other position remote from the opening. A plurality of heater elements are arranged alternately with a plurality of bi-metallic discs within the chamber defined by the shell so that the application of electrical energy to the heating elements causes the discs to expand axially. The heater-disc combination is operatively connected to the valve pin so that the axial expansion movement of the bi-metallic disc causes the valve pin to move towards its second position, opening the expansion port.

The valve disclosed in Kunz works well for its intended purpose. However, certain factors can influence operation of the valve with an associated adverse effect on the particular system in which the valve finds application. Thus, for example, supply voltage variation can affect the valve adversely. The bi-metallic discs of the Kunz motor responds to the heat generated by the heater element. Since the watt output of the heater element is, in accordance with Ohms law, proportional to the voltage input squared divided by the resistance of the heater element, voltage variations in the vicinity of plus or minus ten percent can vary wattage output of the heater by about forty percent. The variations are unacceptable in many applications, where precise positioning of the valve is required.

Ambient temperatures of the valve environment also can affect valve operation. For example, it has become common to operate commercial buildings at a first temperature during business hours of the establishment, and to lower that temperature substantially during non-business hours of the establishment. Thus, supermarkets employing refrigeration systems, where the Kunz valve is employed, often reduce the temperature within the building during the nighttime hours and raise that temperature at or during the periods for which it is open for business. These kinds of temperature variations can cause valve output to vary in proportion to the ambient temperature changes. Likewise, the temperature of the fluid flowing through the valve can affect valve operation. In a refrigeration system, for example, the temperature of the fluid passing through the valve can change considerably, depending on system operating condition and system load.

I have found that applicational utility of the valve disclosed in the above-mentioned Kunz U.S. Pat., No. 3,967,781, can be increased by eliminating the affect of ambient temperatures, fluid temperature fluction and voltage variations resulting in a device far more useful than those available in the prior art. This improvement is achieved with a relatively low cost control means associated with the valve.

One of the objects of this invention is to provide an improved electrically operated valve.

Another object of this invention is to provide a simple, low cost control system for an electrically operated valve.

Another object of this invention is to provide a valve system, the operation of which is solely dependent on an electrical input which is controlled precisely.

Other objects of this invention will be apparent to those skilled in the art in light of the following description and accompanying drawings.

SUMMARY OF THE INVENTION

In accordance with this invention, generally stated, an electrical operable valve is provided with regulator means for precisely controlling valve position. Preferably, the valve includes electrically energizable means operatively positioned with a suitable expanding means and arranged with a valve stem of the valve so that expansion and contraction of the expanding means regulates valve stem position. Means for sensing the temperature of the expanding means is operatively connected to the regulator means. The regulator means compares the sensed condition at the expanding means with a predetermined operation set point and controls power input to the electrically energizable means so that the sensed condition of the expanding means corresponds to the set point. The set point in turn can be obtained from a second sensed system variable.

DESCRIPTION OF THE PREFERRED EMBODIMENT

Figure 1:
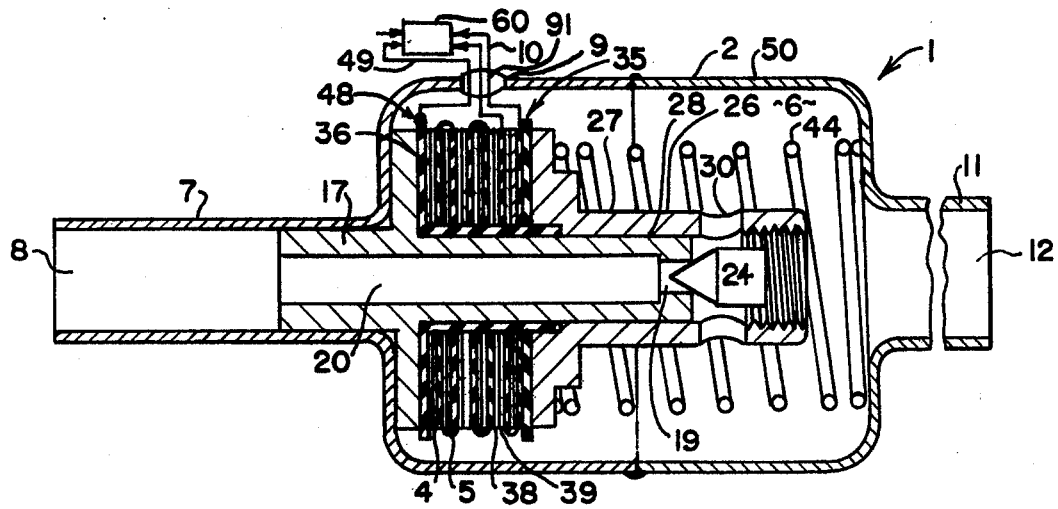
FIG. 1 is a sectional view, partly broken away, showing one illustrative embodiment of valve of this invention.

Referring now to FIG. 1, reference numeral 1 indicates one illustrative embodiment of valve of this invention. The valve 1 includes a valve member 50 and a regulation means 60.

The valve member 50 is conventional and generally corresponds to the valve described in the above-referenced U.S. Pat. to Kunz, No. 3,967,781. Complete details of valve member 50 may be obtained in the Kunz patent, which is incorporated by reference herein. In general, however, the valve member 50 includes an outer shell 2 defining a chamber 6. The shell 2 has a pair of connectors 7 and 11 integrally formed with it. Each of the connectors 7 and 11 have an axial opening through it, which communicates with the chamber 6. In the embodiment illustrated, the connector 7 defines an inlet 8 for the valve 1, while the connector 11 defines an outlet 12 for the valve 1. The shell 2 also has an opening 9 in it, which permits access to the chamber 6 for electrical conductors indicated generally by the reference numeral 10. A suitable seal 91 is provided for insulating the conductors 10 from the shell 2 and for sealing the opening 9 against fluid flow therethrough.

A valve body 17 is mounted within the chamber part 6. The valve body 17 has an axial opening 20 extending through it. The opening 20 communicates with the inlet 8 on a first end, and has a restriction 19 formed along its second end.

A valve member 26 includes a generally cylindrical section 27 having an axial opening 28 through it, the opening 28 being sized to receive the valve body 17 in a slip fit. A valve pin 24 is mounted to the valve member 26 by any convenient method. Valve pin 24 is adapted to close the restriction 19 in at least one position of the valve member 26 and is spaced from the restriction 19 in another position of the valve member 26. The valve member 26 also has a radial opening 30 extending through it, which communicates with the opening 28. The valve pin 24 is shown in its closed position in the drawings.

An electrically operable means 35 is mounted to the valve body 17. The electrically operable means includes an expandable means 4 and an electrical means 5. In the embodiment illustrated, the expandable means 4 comprises a plurality of bi-metallic pairs of discs 36 interleaved between a plurality of heater elements 37, the heater elements 37 forming the electrical means 5.

Each of the bi-metallic disc pairs 36 are annular in plan and include a first metal disc 38 and a second metal disc 39 having substantially different coefficients of expansion. The discs 38 and 39 are bonded along their mating edges by any convenient method.

Figure 4:
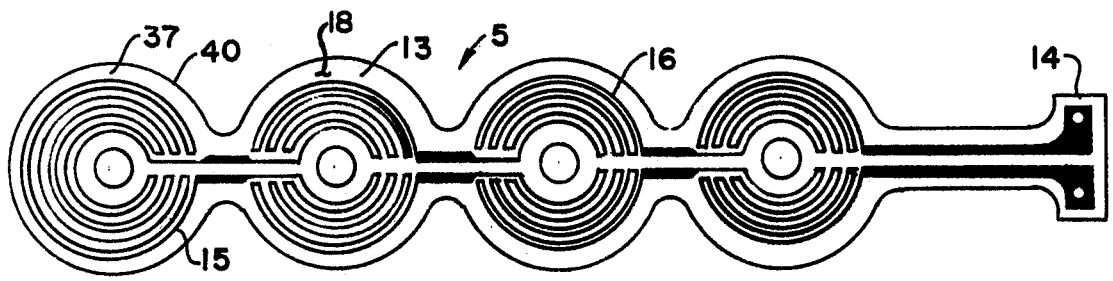
FIG. 4 is a top plan view of a heater means used in conjunction with the valve of FIG. 1.
Figure 5:
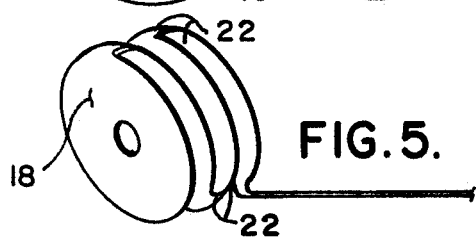
FIG. 5 is a view in perspective, partly broken away, of the heater means of FIG. 1.

The heater element 37, best illustrated in FIG. 4, preferably includes a plurality of annular devices 40, including a resistive means 15 encapsulated in a suitable insulative material 13. The heater element 37 has a connection end 14 where two of the conductors 10 may be electrically connected to the resistive means 15. The resistive means 15 is arranged to define a series of resistance heaters 16. The heaters 16 are carried between a pair of thin film surfaces 18 constructed from the material 13. "Mylar" or other similar substance works well for the material 13. The surfaces 18 are closed along their peripheral edges to encapsulate and insulate the resistance heaters 16. Thereafter, the annular devices 40 are folded in a serpentine manner, best illustrated in FIG. 5 and the discs 36 are inserted between successive ones of a plurality of folds 22 so formed. The disc-heater package then may be placed over the valve body 17 along openings formed along the central portion of both the heater elements 37 and the discs 36. Suitable insulation between the valve body 17 and the electrically energizable means 35 may be provided, if desired.

A spring 44 is biased between the shell 2 and the valve member 26. Spring 44 biases the valve member 26 towards the closed position of the valve pin 24. The spring 44 preferably is a conventional coil compression spring, the spring constant of which is chosen so that a predetermined spring force is overcome before the valve member 26 and valve pin 24 move from the closed position shown in the drawings.

As may be observed in FIG. 1, the chain of bimetallic discs 36 and heater elements 37 of the electrically operable means 35 are in force transmittible relationship with the valve body 17 and the valve member 26. Valve operation is conventional in that flow through the valve is restricted so long as the force exerted by the spring 44 is not overcome. The spring force of the spring 44 is overcome by the action of the electrically operable means 35. Application of electrical energy to the means 35 causes the heater elements 37 to radiate thermal energy as the electrical energy dissipates in the element 37. That is to say, the amount of voltage applied to the heater elements 37 will increase or decrease the heat supply to the discs 36. Since the discs 36 comprise two different metal discs 38 and 39, expansion of the metal used for the discs occurs at different rates. Consequently, the discs 10 become bow shaped with respect to one another. That is, the discs will expand axially, causing movement of the member 26 with subsequent opening or closing of the valve.

Figure 6:
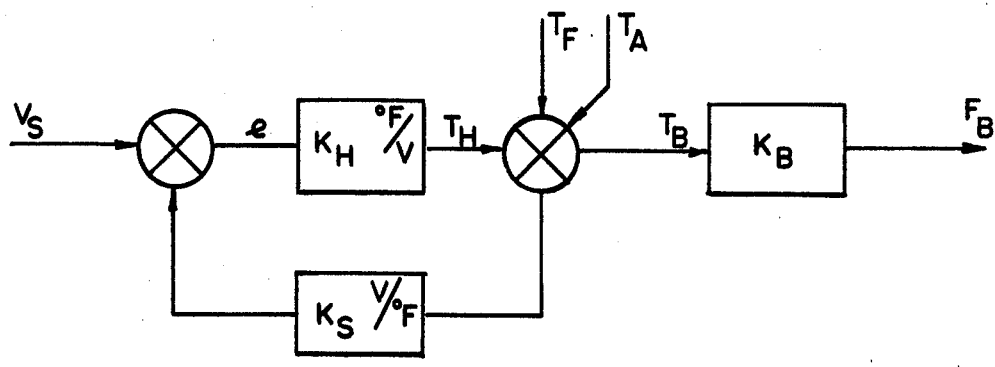
FIG. 6 is a diagrammatic view and mathematical explanation for the operation of the valve of FIG. 1.

The force exerted by the discs 36 depends upon the temperature of the heater element 37, the temperature of the fluid passing through the valve and the ambient temperature of the environment in which the valve 1 operates. These relationships are illustrated in FIG. 6. As may be observed in that FIG., the force on the bi-metal $F_B$ is a function of the temperature of the bi-metal, $T_B$, times some constant $K_B$, the constant $K_B$ being a function which depends upon the choice of the bi-metal utilized in the discs 38 and 39. By choosing the bi-metal temperature as a feedback signal, the temperature of the bi-metal discs 36 may be denominated as $T_B$. $T_B$ then may be expressed as follows: $T_B = T_H + T_F + T_A$, where $T_H$ = temperature contributed by heater element 37; $T_F$ = temperature of the fluid passing through the valve member 26; and $T_A$ = ambient temperature. $T_H$ in turn equals $eK_H$, where $e$ is equal to an error signal. The error signal $e$ is equal to $-T_B K_S + V_S$, where $K_S$ is a constant dependent upon location of the sensor used to determine the temperature of the bi-metal and $V_S$ represents the electrical representation of the set point for the voltage input to the means 35. By substituting terms, grouping like variables, and making the assumption that $K_H$ is much greater than 1, it is seen that temperature of the bi-metal $T_B$ will be equal approximately to the set point voltages $V_S$.

Figure 2:
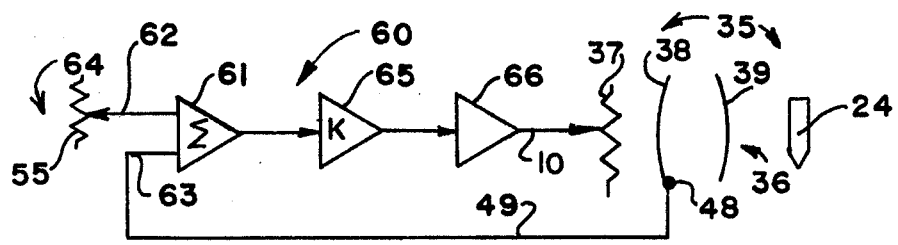
FIG. 2 is a diagrammatic view of the valve shown in FIG. 1.

FIG. 2 illustrates an embodiment for accomplishing the result described in FIG. 6. As shown in FIG. 2, a temperature sensor 48 is operatively connected to the bi-metallic discs 36, enabling the sensor 48 to establish an electrical signal representation of the temperature of the discs 36. This signal is fed to the regulation means 60 along a conductor 49. Preferably, regulation means 60 includes a summing amplifier 61 having a first input 62 and a second input 63. Input 62 is connected to a voltage source 64. The source 64 may be any convenient source of electrical voltage. It is illustrated as a potentiometer 55 which is used to provide the desired set point for the valve 1. The second input 63 of the amplifier 61 is connected to the sensor 48, along the conductor 49. Output of the summing amplifier 61 forms an input to a series of amplifiers 65 and 66 respectively. The output of the amplifier 66 is electrically connected to the heater element 37. It thus may be observed that the power input to the heater element 37 is dependent upon the feedback of bi-metallic discs 36 temperature, and that feedback varies the power input to the heater element 37 to control valve 1 operation. The use of regulation means 60 eliminates ambient temperature and fluid temperature as factors in valve 1 operation.

Figure 3:
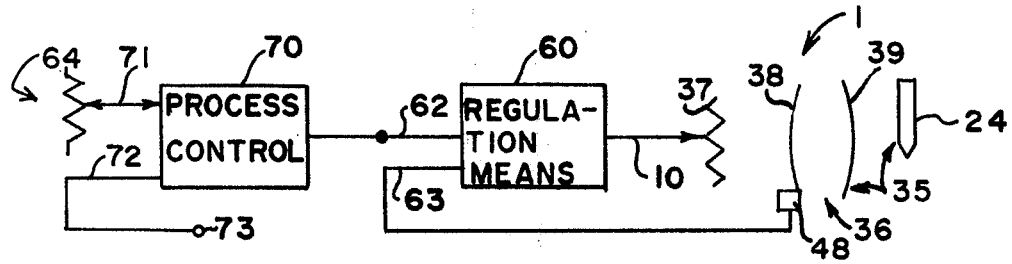
FIG. 3 is a block diagrammatic view of a system employing the valve of FIG. 1.

FIG. 3 applies the stand alone device described in FIG. 2 to a system. As FIG. 3 shows diagrammatically, the regulation means 60 is operatively connected to a process control means 70. Process control means 70 has a first input 71 connected to the voltage source 64 while a second input 72 is connected to a suitable sensor 73. Sensor 73 is adapted to follow the condition of any suitable variable for controlling valve operation. The voltage means 64 preferably is a source of regulated power and the process control means 70 merely varies input to the regulating means 60 in accordance with the state of the condition sensed by the sensor 73.

From the foregoing, it may be seen that this invention is one well adapted to obtain all the ends and objects herein set forth, together with other advantages which are obvious and which are inherent to the structure.

Numerous variations, within the scope of the appended claims, will be apparent to those skilled in the art in light of the foregoing description and accompanying drawings. Thus, the silhouette of the shell 2 may vary in other embodiments of this invention. While the valve 1 is illustrated as a straight line valve, other valve forms are compatible with the broader aspects of the invention. The number of bi-metallic discs 36 or heater elements 37 used in conjunction with the electrical energizable means 35 may vary. Although in their preferred form, the heater means and discs are interleafed with one another, interleafed is intended, for the purposes of the specification to encompass situations in which the elements are not placed in an exact heater-disc relationship. It also is apparent that additional sensing elements may be used to obtain a desired operating point for the valve of this invention, in place of those described in conjunction with the preferred embodiment. While the valve 1 is shown as normally closed, the valve structure can be arranged so that the valve is normally open, application of electrical energy to the means 35 functioning to drive the valve to its closed position. In its various configurations, this invention may find application in hydronics, pneumatics, air handling damper controls and other process control valves, for example. These variations are merely illustrative.

Having thus described the invention, what is claimed and desired to be secured by Letters Patent is:

1. A temperature compensated electrically operated modulating valve, comprising:
 a valve including a shell, said valve having an inlet, an outlet and valve means for regulating fluid flow between said inlet and said outlet;
 electrically energizable means for controlling the operating position of said valve means, said electrically energizable means including heater means mounted within said shell, said heater means comprising a first insulative surface, a second insulative surface and a resistive heater interposed between said first and said second surfaces, said heater means being flexible and folded to define receptacles for receiving a plurality of bimetallic discs interleaved between folds of said heater means;
 sensing means mounted to at least one of said bimetallic discs for sensing the temperature of said electrically energizable means, the temperature of said electrically energizable means being dependent upon the temperature of said heater means, the temperature of the fluid passing between the inlet and outlet of the valve, and the ambient temperature of the valve; and
 means for regulating power input to said electrically energizable means operatively connected to said sensing means, said regulating means adjusting the power input to said heater means to control the position of said valve means, said input power regulating means comprising a summing amplifier having a first input and a second input, said first input being electrically connected to a reference signal source, the second input being electrically connected to said sensing means, said summing amplifier having an output operatively connected to said electrically energizable means.

2. The valve of claim 1 further characterized by process control means electrically connected to said regulating means, said process control means sensing a variable of a system incorporating said valve and providing a reference signal to said regulating for determining the operating point of said valve.

3. The valve of claim 2 wherein said regulating means varies the power input to said heater means so as to maintain the quality between the input signals at the first and second inputs of said regulating means.

4. The valve of claim 3 wherein said electrically operable means has an axial passageway in it, said heater means being mounted over a fluid conduit in said valve.

* * * * *

UNITED STATES PATENT AND TRADEMARK OFFICE
CERTIFICATE OF CORRECTION

PATENT NO. : 4,096,993
DATED : June 27, 1978
INVENTOR(S) : Joseph L. Behr

It is certified that error appears in the above-identified patent and that said Letters Patent are hereby corrected as shown below:

Column 3, line 62, delete "bimetallic" and insert
--- bi-metallic ---.

Signed and Sealed this

First Day of May 1979

[SEAL]

Attest:

RUTH C. MASON
Attesting Officer

DONALD W. BANNER
Commissioner of Patents and Trademarks